US007251061B2

(12) United States Patent
Larson et al.

(10) Patent No.: US 7,251,061 B2
(45) Date of Patent: Jul. 31, 2007

(54) RESOLUTION ENHANCEMENT APPARATUS, SYSTEMS, AND METHODS

(75) Inventors: Brad R. Larson, Meridian, ID (US); Eugene A. Roylance, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 981 days.

(21) Appl. No.: 10/284,868

(22) Filed: Oct. 31, 2002

(65) Prior Publication Data

US 2004/0085593 A1 May 6, 2004

(51) Int. Cl.
*H04N 1/405* (2006.01)
(52) U.S. Cl. .................................. 358/3.27; 358/3.06
(58) Field of Classification Search ................ 358/1.9, 358/3.27, 3.06–3.12, 428, 443, 448–449, 358/520, 522
See application file for complete search history.

(56) References Cited

U.S. PATENT DOCUMENTS 6,317,848 B1  11/2001  Sorens et al.
6,757,449 B1 *  6/2004  Loce .......................... 382/299

FOREIGN PATENT DOCUMENTS

EP          0905970        3/1999

OTHER PUBLICATIONS

British Search Report dated Apr. 30, 2004.

* cited by examiner

*Primary Examiner*—Thomas D. Lee
*Assistant Examiner*—Stephen Brinich

(57) ABSTRACT

An apparatus and system include means to identify first and second pixel toner densities associated with selected pixels included in a color plane window, and means to generate at least one modified color plane window having identifications assigned to the pixel toner densities for transmission to a monochrome enhancement module. An article contains instructions causing a machine to execute a method including selecting a plurality of original color plane windows, each having a number of pixels, associating each pixel in each of the windows with an identification of VALID or INVALID, generating a plurality of modified windows to correspond to the plurality of original windows, wherein each one of the plurality of modified windows includes the associated identifications, and transmitting the modified windows to a monochrome enhancement module.

9 Claims, 6 Drawing Sheets

RESOLUTION ENHANCEMENT APPARATUS, SYSTEMS, AND METHODS

RELATED APPLICATIONS

This application is related to co-pending application Ser. No. 08/864,944 titled "Luminance-based Color Resolution Enhancement", filed on May 28, 1997, which is commonly assigned to the assignee of the present invention.

TECHNICAL FIELD

Embodiments of the invention relate generally to apparatus, systems, and methods for resolution enhancement.

BACKGROUND INFORMATION

Edge or line jaggedness is a common problem associated with the printing of binary image data, since forced dot placement on a fixed grid can result in visible irregularities. As a result, different approaches have been implemented to smooth line jaggedness, including template matching and outline extraction. Both methods typically use a bitmap as an input file. Digital processing operations are performed on the input file to produce an enhanced image output file, which is subsequently supplied to a print head to produce a hard copy of the image.

Some difficulties arise, however, when using template matching or outline extraction methods to provide edge enhancement. For example, the number of templates employed during template matching is usually limited to maintain acceptable processing speeds. However, if the number of templates is severely restricted, some number of the patterns within the input file bitmap will not match the available templates, and edge resolution enhancement cannot be performed regardless of the resulting image quality.

During outline extraction, variable dot sizes are used to fill in character outlines. However, the filling process typically requires an increasing number of resources as smaller fonts are employed. In addition, closely spaced, thin lines, such as those which appear in a graph, may be broadened to the point of merger, resulting in a perceivable reduction in image resolution.

Attempting to smooth jaggedness in color images before they are printed increases the number of problems encountered. For example, the unwanted results of managing multiple color planes can include the disruption of halftone data and undesirable color shifting at the edges of the images being processed. Processing information from several color planes can also require resources beyond those available during various parts of the printing process.

DETAILED DESCRIPTION

Figure 1:
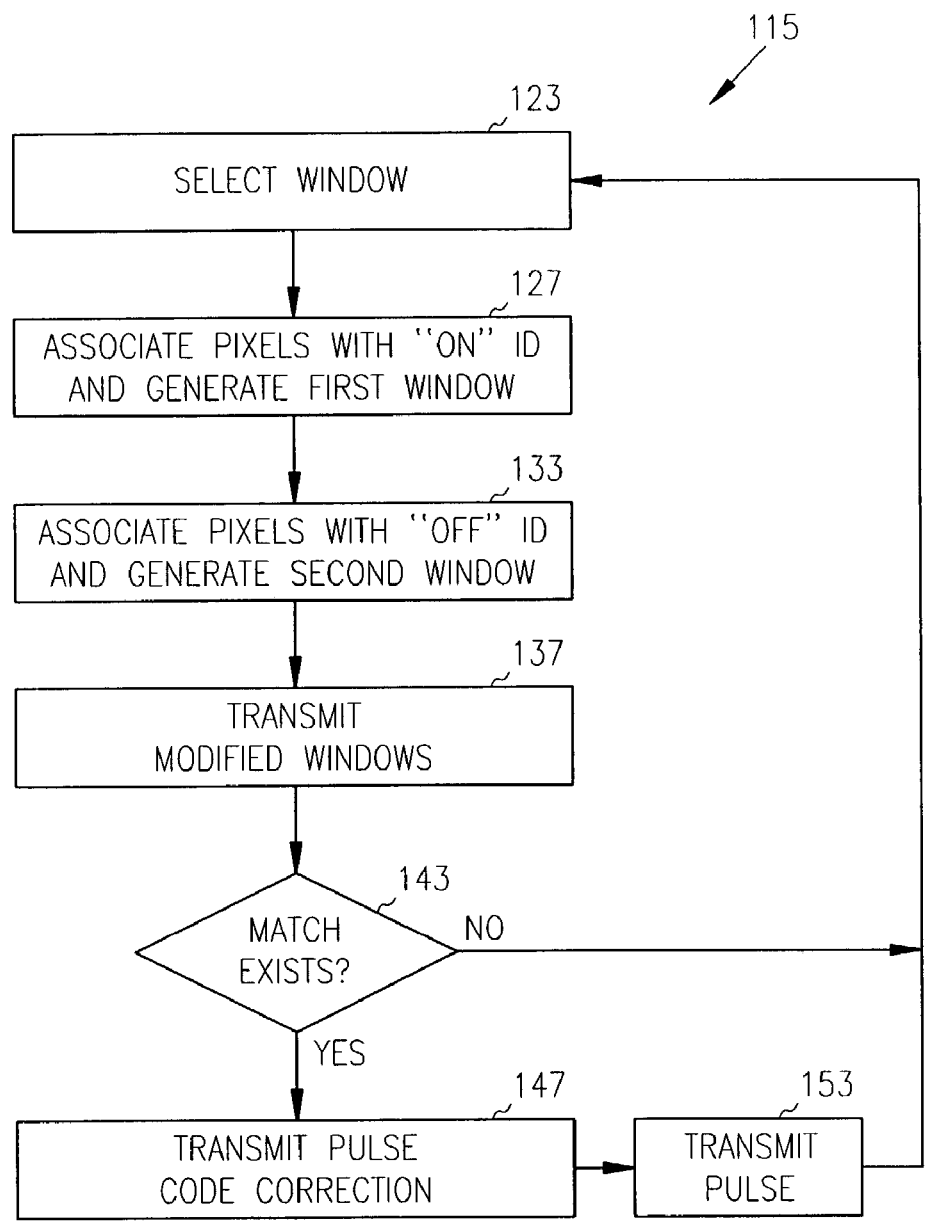
FIG. 1 is a flow diagram illustrating a method according to an embodiment of the invention.

In the following detailed description of various embodiments of the invention, reference is made to the accompanying drawings that form a part hereof, and in which are shown by way of illustration, and not of limitation, specific embodiments in which the invention can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. The following detailed description, therefore, is not to be taken in a limiting sense, and the scope of various embodiments of the invention is defined only by the appended claims, along with the full range of equivalents to which such claims are entitled.

A gray level image comprises a multiplicity of pixels, each pixel represented by a digital (e.g., binary or multibit) value indicative of a gray level or a color value. Each gray level corresponds to a toner density between 0% and 100%. When this type of gray level image is passed to a binary laser printer, the gray level values are converted to binary pixel values using dither procedures or other approximation methods in an attempt to faithfully reproduce the gray level image. For example, gray level laser printers typically operate to modulate a laser beam intensity or duration to achieve a variation in charge state at each pixel location on a photoconductor which, when subsequently toned, produces a highly faithful gray level reproduction.

As noted previously, edge definition is a problem in binary pixel images due to the stepped pixel arrangement employed to represent boundaries of characters and images. The prior art has employed a procedure, generally called "Resolution Enhancement technology," (REt) to smooth edges by modulating pixels in accordance with comparisons made to pre-stored template arrangements. U.S. Pat. Nos. 4,847,641, and 5,005,139, issued to C. C. Tung and assigned to the same Assignee as the content of this disclosure, describe a hardware-based method for accomplishing REt edge enhancement. The content of these patents is incorporated herein by reference in its entirety.

The REt procedure logically tiles "windows" over successive bit patterns of an image, each image pixel window comprising a center pixel and surrounding neighbor pixels. Each image pixel window therefore comprises a pattern of pixels taken from the original binary image. Each image pixel window is compared, in parallel, against hundreds of templates, each template defining an expected edge pixel arrangement that can be improved by modification of the central pixel in the image pixel window. Each template is associated with a correction pixel value for the central pixel of an image pixel window.

The central pixel and neighbor pixels within the image pixel window are compared against the templates, in parallel, usually via a gate array or application specific integrated circuit (ASIC), so as to determine which template, if any, matches the pixel arrangement within the image pixel window. If a template is found to match the image pixel window pattern, the associated correction pixel value is output and is substituted for the central pixel in the image pixel window. Thus, as the image pixel window is stepped across the image, corrections are made to any pixel arrangement therein which matches a template so as to improve edge presentation of the binary image. REt has been successful in improving print quality of monochrome binary pixel value images, and is referenced as an example herein according to various embodiments of the invention to operate on color plane windows, selected from one of a plurality of color planes forming an image. For example, a set of color planes comprising an image may include cyan, magenta, yellow, and black, among others.

FIG. 1 is a flow diagram illustrating a method according to an embodiment of the invention. The method 115 begins with selecting an original window with a number of pixels taken from one or more color planes of a multi-plane color image at block 123. For example, a 5×5 bit window, containing 25 pixels, may be selected from the Cyan color plane of an image, although embodiments of the inventions are not so limited, such that multiple color planes can be selected for processing at the same time.

The method 115 continues with associating a first selected number of pixels in the original window with an identification of ON to generate a first modified window at block 127. The first modified window includes some number of ON identifications, each associated with the first set of selected pixels. In one embodiment, the ON identifications in the first modified window are associated with selected pixels in the original window having a pixel toner density of approximately 100%. However, the amount of toner density used for association with an ON identification can be adjusted. For example, the ON identifications in the first modified window can be associated with those pixels in the original window having a pixel toner density of greater than approximately 90%.

The method 115 continues in block 133 with associating a second selected number of pixels in the original window with an identification of OFF to generate a second modified window. The second modified window includes some number of OFF identifications, each associated with the second set of selected pixels.

In one embodiment, the OFF identifications in the second modified window can be associated with selected pixels in the original window having a pixel toner density of approximately 0%. However, as noted for the first set of selected pixels, the amount of toner density used for association with an OFF identification can also be adjusted for the second set of selected pixels. For example, the OFF identifications in the second modified window can be associated with those pixels in the original window having a pixel toner density of less than approximately 10%.

The method 115 then continues with transmitting the first and second modified windows to some form of binary anti-aliasing module, such as, for example, a monochrome resolution enhancement template (MREt) logic module (e.g., hardware, software or combination logic which implements the REt operations described above) at block 137. MREt logic is one of several monochrome enhancement techniques or methods that can be used to provide corrections to individual monochrome windows of pixels to smooth jagged edges. While embodiments of the invention can make use any of these monochrome anti-aliasing techniques or methods, an MREt logic module will be used herein as an example, both for consistency, and so that the description of the invention is not obscured.

Therefore, in one embodiment, corrections for each of the modified color plane windows are provided by a monochrome enhancement logic module, such as the MREt logic. Such corrections can be supplied in the form of no correction, 50% top or bottom correction; and 50% left or right correction, for example, although embodiments of the invention are not so limited.

The method 115 continues at block 143 by determining whether a correction match exists between corrections applied to the first and second modified windows, respectively, by the MREt logic. For example, if no correction is applied to either of the modified windows, a correction match exists and no correction will be applied to the original color plane window. Similarly, if a 50% top correction is chosen by the MREt logic as appropriate for application to each of the modified windows, a correction match exists and a 50% top correction will be applied to the original color plane window. On the other hand, if a 50% left correction is chosen by the MREt logic as appropriate for application to the first modified window, and a 50% right correction is chosen by the MREt logic as appropriate for application to the second modified window, no correction match exists and no correction will be applied to the original color plane window. If no correction match exists, the method 115 may continue with selecting one or more new original color plane windows for analysis at block 123.

If a correction match exists, the method 115 can continue by transmitting one or more pulse code corrections for the original color plane window to other operations at block 147, and/or transmitting one or more correction pulses (to be applied on behalf of the original color plane window) to a pixel generation mechanism, such as a video output or other subsequent operation processing block. Examples of pulses which may be transmitted, perhaps in the form of a carrier wave, include no pulse, a centered half-pulse, a left-justified half-pulse, a right-justified half-pulse, a top-justified half-pulse, and a bottom justified half-pulse, among others, and embodiments of the invention are not so limited. The method 115 then continues with selecting one or more new original color plane windows for analysis at block 123. It should be noted that the final decision as to whether a correction will be applied can be made to depend on the results of processing more than one color plane, if desired.

Figure 2A:
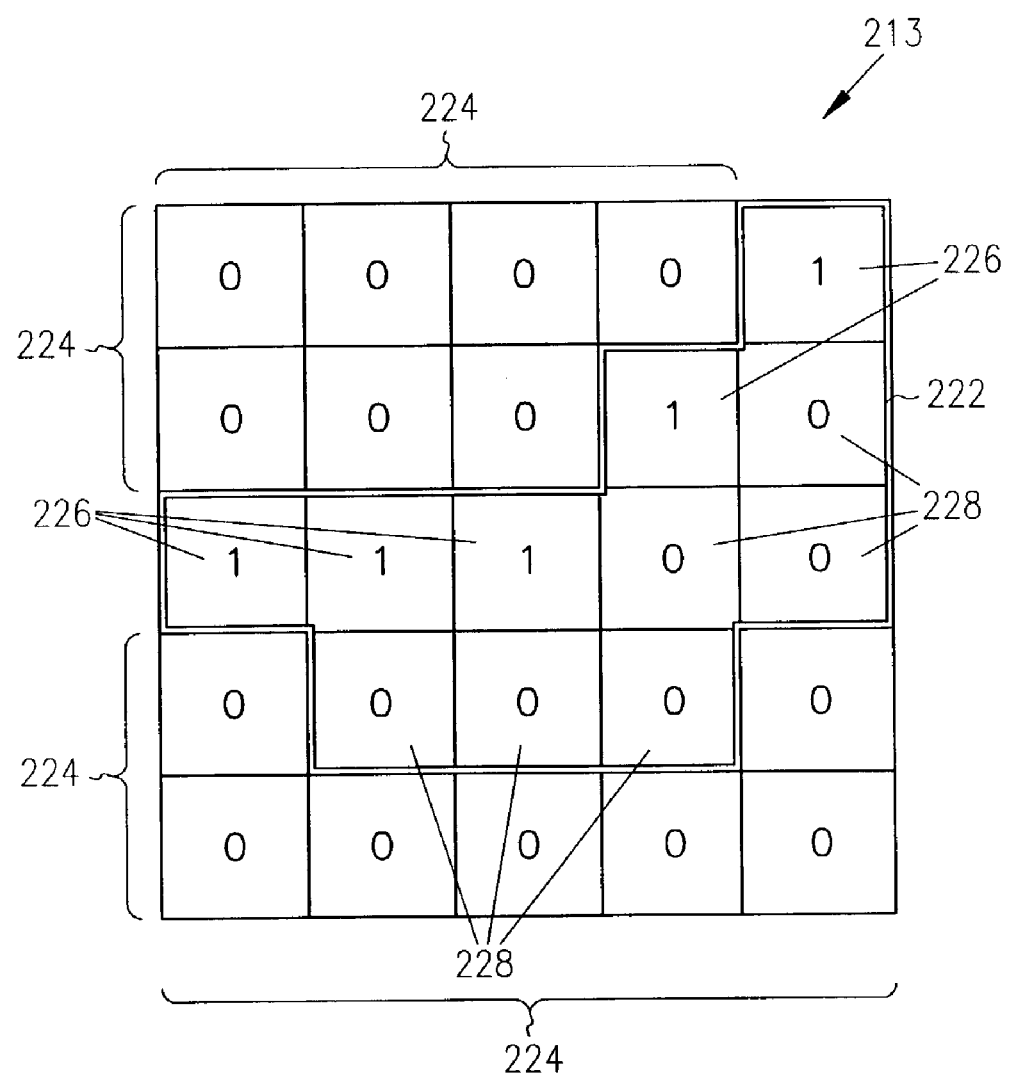
FIGS. 2A, 2B, and 2C are modified color plane windows according to various embodiments of the invention.
Figure 2B:
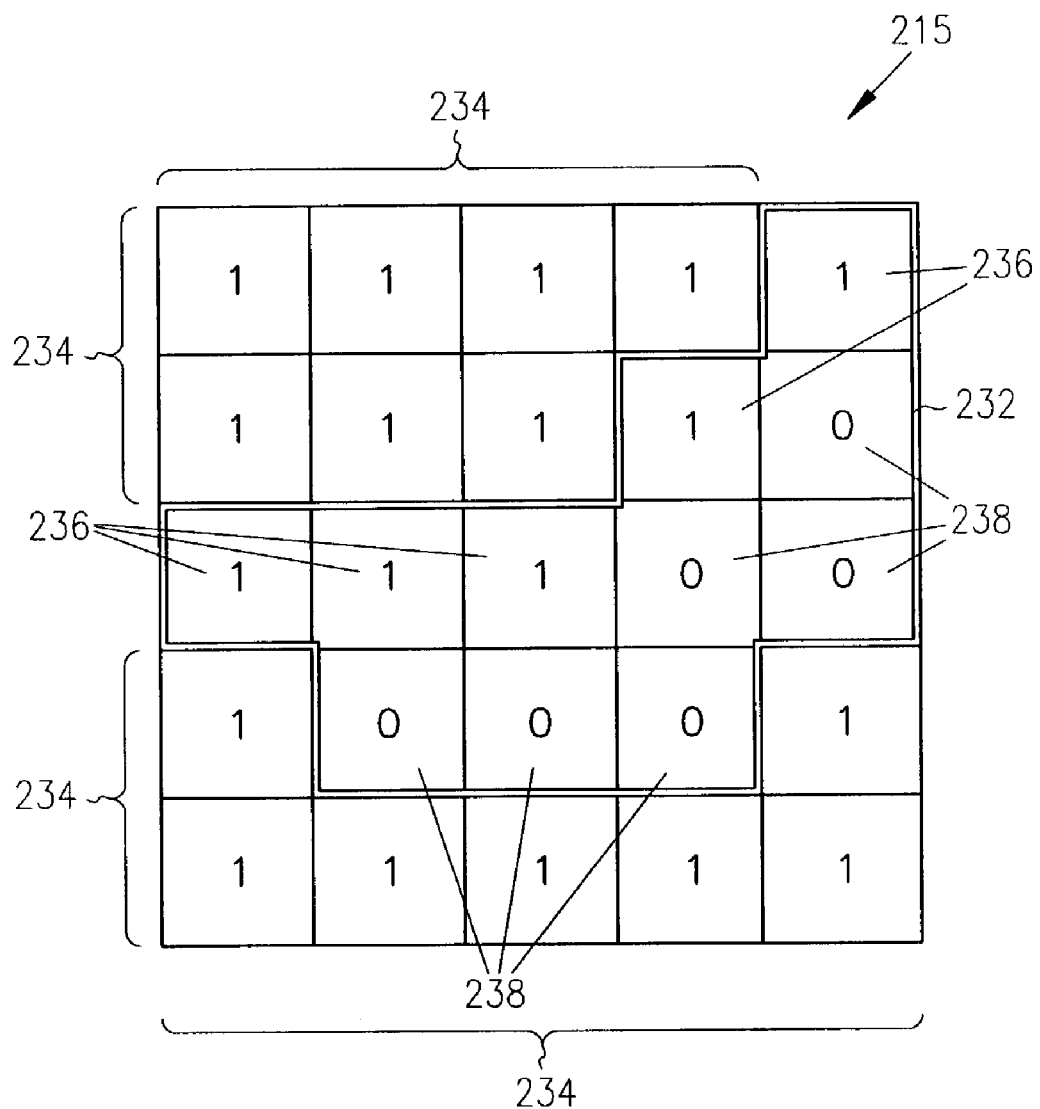
Figure 2C:
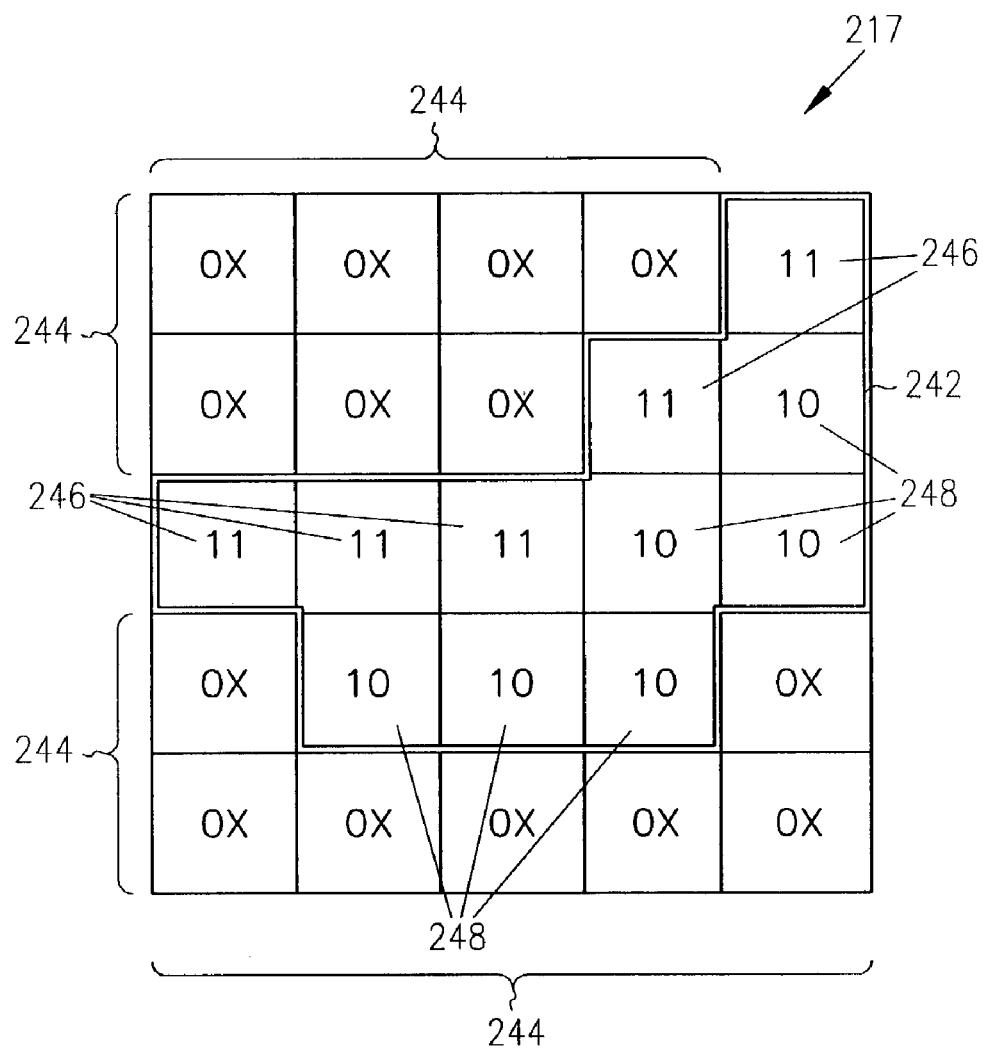

FIGS. 2A, 2B, and 2C are modified color plane windows according to various embodiments of the invention. In FIGS. 2A and 2B, modified color plane windows 213 and 215, respectively, illustrate the identifications of VALID and INVALID, as well as ON and OFF, which may be associated with various pixels in each window. For example, in FIG. 2A, the modified color plane window 213 is shown as a 5×5 pixel modified color plane window 213, which can be derived from an original color plane window taken from the cyan color plane of an image, although embodiments of the invention are not so limited.

All pixels in the region 222 are determined to have a toner density of approximately 100% or 0%. Such pixels are designated as VALID pixels. All pixels in the regions 224 are determined to have some other toner density (e.g. 20%, 50%, 90%, etc.), and are designated as INVALID pixels. The pixels 226 in the region 222 determined as having a toner density of approximately 100% can be associated with an identification of ON, perhaps by marking the location of the pixels 226 in the window 213 and region 222 using a binary "1".

Similarly, the pixels 228 in the region 222 determined as having a toner density of approximately 0% can be associated with an identification of OFF, perhaps by marking the location of the pixels 228 in the window 213 using a binary "0". Binary "0"s can also be used to mark INVALID pixels (refer to block 127 in FIG. 1) in regions 224 (i.e., those pixels which would be halftoned anyway, and thus, which should not be processed by the MREt logic, or other anti-aliasing technology/method which is used). Therefore, the first modified window shown in FIG. 2A includes a number of identifications associated with the pixels in the original window. In this embodiment, the identifications of the pixels are marked with contrasting binary values in order to allow the use of binary processing techniques.

In FIG. 2B, the modified color plane window 215 is also shown as a 5×5 pixel modified color plane window 215, which may also be a modified version of an original window taken from the cyan color plane of an image, although embodiments of the invention are not so limited. Again, all pixels in the region 232 are determined to have a toner density of approximately 100% or 0%. Such pixels are designated as VALID pixels. All pixels in the regions 234 are determined to have some other toner density (e.g. 20%, 50%, 90%, etc.), and are designated as INVALID pixels. The pixels 236 in the region 232 determined as having a toner density of approximately 100% can be associated with an identification of ON, perhaps by marking the location of the pixels 236 in the window 215 and region 232 using a binary "1".

Similarly, the pixels 238 in the region 232 determined as having a toner density of approximately 0% can be associated with an identification of OFF, perhaps by marking the location of the pixels 238 in the window 215 using a binary "0". Binary "1"s can be used to mark INVALID pixels (refer to block 133 in FIG. 1) in regions 234 (i.e., those pixels which would be halftoned anyway, and thus, which should not be processed by the MREt logic, or other anti-aliasing technology/method which is used). Therefore, the second modified window shown in FIG. 2B also includes a number of identifications associated with the pixels in the original window. Again, in this embodiment, the identifications of the pixels are marked with contrasting binary values in order to allow the use of binary processing techniques.

As noted in the method illustrated by FIG. 1, the modified color plane windows 213 and 215 can be transmitted to MREt logic to determine which corrections will be applied to each window, so that a comparison between the corrections can be made. In the case of window 213, it should be noted that there will be true "1"s and true "0"s, with potential false "0"s with respect to the pixels having toner densities of approximately 0%. On the other hand, in the case of window 215, there will be true "1"s and true "0"s, with potential false "1"s with respect to the pixels having toner densities of approximately 100%. It is for this reason that a comparison is made between the MREt correction results obtained for each window 213 and 215. In this way, REt jagged edge corrections are applied only when appropriate (i.e., when matches are found for true "1"s and true "0"s), and no correction is applied otherwise.

Other approaches to identifying pixels in color plane windows for MREt (or other monochrome enhancement module) processing according to various embodiments of the invention are possible. For example, instead of generating two modified windows for every original color plane window, a single, modified window can be generated. FIG. 2C illustrates such a modified color plane window 217.

In this embodiment, the modified color plane window 217 is shown as an X by X color plane window 217, where X=5, although embodiments of the invention are not so limited. The color plane window 217 can be derived from an original color plane window taken from the cyan color plane of an image, although embodiments of the invention are not so limited, such that other color planes can be used, including, for example, magenta, yellow, and black, among others. All pixels in the window 217 are determined to have a toner density of approximately 100%, approximately 0%, or "other".

Thus, in this embodiment, the pixels in region 242 can be marked with binary values of the form "1x", indicating that the pixels so marked are VALID. Similarly, all pixels in the regions 244 determined to have some "other" toner density (e.g. 20%, 50%, 90%, etc.) can be marked with contrasting binary values in the form of "0x", indicating that the pixels so marked are INVALID, although embodiments of the invention are not so limited.

The pixels 246 in the region 242 determined to have a toner density of approximately 100% can be associated with an identification of ON, perhaps by marking the location of the pixels 246 in the window 217 and region 242 using a binary "1" in place of the "x" of the "1x" notation. Similarly, the pixels 248 in the region 242 determined to have a toner density of approximately 0% can be associated with an identification of OFF, perhaps by marking the location of the pixels 248 in the window 217 and region 242 using a binary "0" in place of the "x" in the "1x" notation, although embodiments of the invention are not so limited. Finally, binary "0"s can also used to mark INVALID pixels in regions 244 (i.e., those pixels which would be halftoned anyway, and thus, which should not be processed by the MREt logic, or other anti-aliasing technology/method which is used) by substituting the binary "0" (i.e., "don't care" or doesn't matter) in place of the "x" in the "0x" notation. Thus, the single modified window shown in FIG. 2C also includes a number of identifications associated with the pixels in the original color plane window. In this embodiment, the identifications of the pixels are marked with multi-bit contrasting binary values, although various embodiments of the invention are not so limited. Generating a single modified color plane window in this manner obviates the need for sending two modified windows to the MREt logic, as will be demonstrated hereinbelow.

Figure 3:
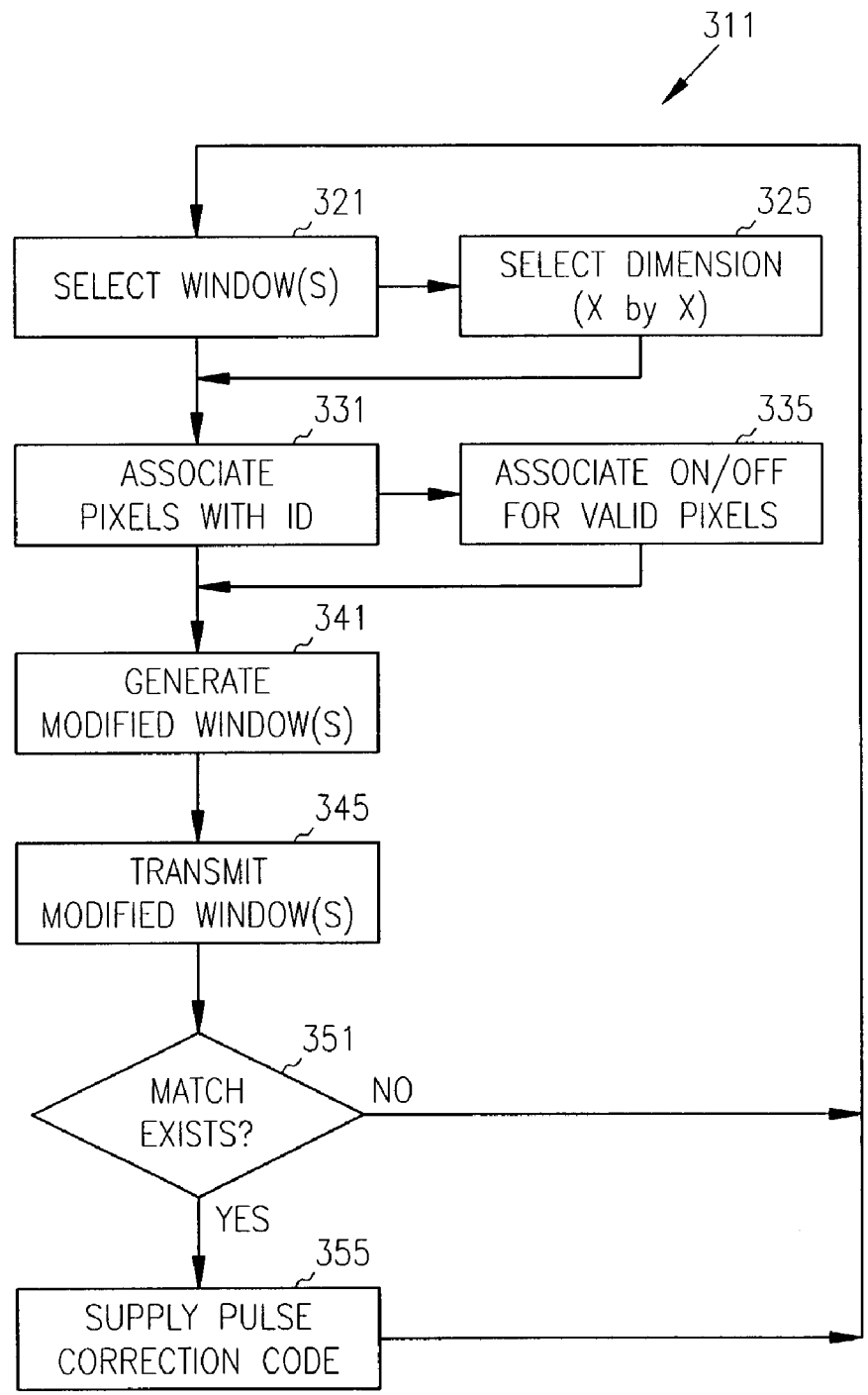
FIG. 3 is a flow diagram illustrating a method according to an alternative embodiment of the invention.

FIG. 3 is a flow diagram illustrating a method according to an alternative embodiment of the invention. The method 311 begins with selecting one or more original color plane windows, each having a number of pixels included in at least one color plane of a multi-plane color image at block 321. Selecting the plurality of original windows can include selecting windows having dimensions of X by X bits, where X is equal to an odd number greater than or equal to three, at block 325. For example, as noted above, the original color plane window might have dimensions of 5 by 5 bits/pixels. Of course, the original window may also have dimensions of 3 by 3 bits/pixels, 7 by 7 bits/pixels, and so forth. This variation in original window size applies with equal force to the method described in FIG. 1.

The method 311 continues by associating each pixel in the original window with an identification of VALID or INVALID to provide a number of identifications at block 331. As shown in FIGS. 2A-2C, associating each pixel in each one of the plurality of original windows with an identification of VALID can include associating pixels with an identification of ON or OFF (e.g., using contrasting binary values or other mechanisms) at block 335. The method 311 continues with generating one or more modified windows, each including a number of identifications for at least the VALID pixels at block 341, and then transmitting the modified window(s) to MREt logic (or some other monochrome enhancement module) at block 345.

The method 311 continues with determining whether a match exists at block 351 between a template and the modified window(s). In this case, since the modified window of FIG. 2C can be submitted to the MREt logic, VALID pixels are designated at the same time as those pixels having toner density values of approximately 100% and 0%. Thus, there is no need for the transmission of two separate modified windows; the MREt logic merely needs to operate on the VALID pixels, and to ignore the INVALID pixels. The possibility of false designations is eliminated using this method because the match between the template and the data is based only on data pixels that are true "1"s and "0"s, and not on pixels that may have been falsely marked as either "1" or "0".

If no match exists at block 351, then the method 311 continues with a new window block 321. Otherwise, if a match exists, the method continues at block 355 with supplying a pulse code correction to a subsequent operation, and/or output video. In one embodiment, the method 311 then continues with selecting one or more new windows from one or more color planes at block 321. As noted previously, the final decision as to whether a correction will be supplied can be made to depend on the results of processing more than one color plane, if desired.

Figure 4:
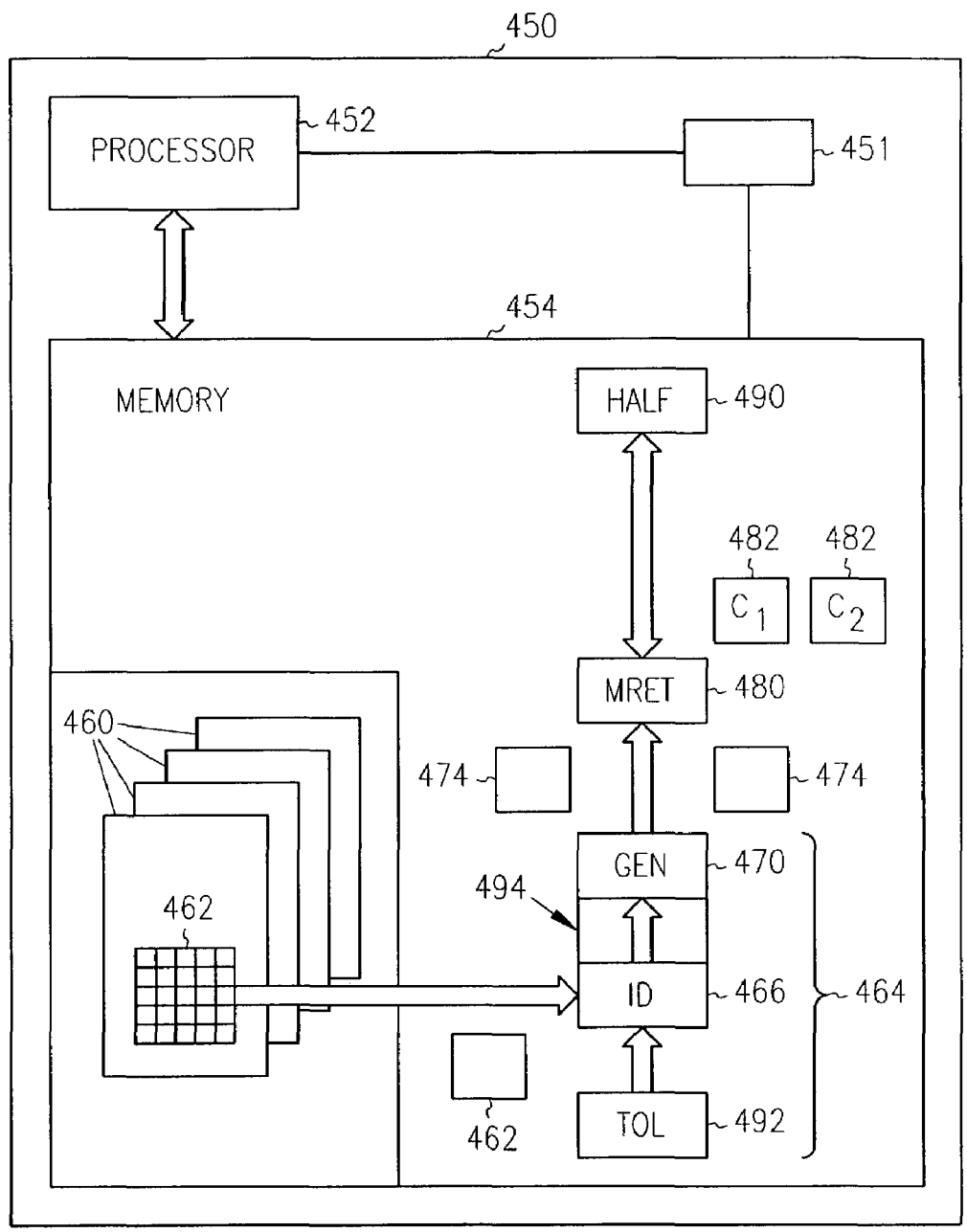
FIG. 4 is a block diagram of an apparatus, an article including a machine-accessible medium, and a system according to various embodiments of the invention.

FIG. 4 is a block diagram of an apparatus, an article including a machine-accessible medium, and a system according to various embodiments of the invention. In one embodiment, a system 450 includes a processor 452 capable of being communicatively coupled to and controlling a memory 454, as well as communicating with and controlling various modules that can be included in the memory 454. The memory 454 can also include one or more images, each comprising a plurality of color planes 460. Each of the color planes 460, in turn, includes a plurality of original color plane windows 462, similar to or identical to the original color plane windows described previously.

The system 450 may include an apparatus 464 used to assist in determining whether jagged edge corrections should be applied to windows 462 taken from the color planes 460. As noted above, the color planes 460 can include cyan, magenta, yellow, and black, among others, and embodiments of the invention are not so limited.

In one embodiment, the apparatus 464 includes means 466 to identify a first pixel toner density and a second pixel toner density associated with selected ones of a plurality of pixels included in the original color plane window 462. The identifications corresponding to the first and second selected numbers of pixels can be chosen from contrasting binary bit values, as described previously, although embodiments of the invention are not so limited.

The apparatus 464 also includes means 470 to generate at least one modified color plane window 474 having identifications assigned to the first and second pixel toner densities, as described above. The first and second pixel toner densities may be approximately 100% and 0%, although embodiments of the invention are not so limited.

The means 470 to generate modified color plane window(s) 474 transmits the window(s) 474 to a monochrome enhancement logic module 480, such as the MREt logic 480, where correction(s) 482 can be determined and/or applied. Depending on the method used (e.g., see FIGS. 1 and 3), comparisons between the corrections 482 can be made to determine whether a pulse code correction will ultimately be applied to the color plane window 462, as discussed with respect to FIG. 1. Correction(s) 482, if made, can then be submitted to a halftone module 490. The halftone module 490 is capable of being communicatively coupled to the processor 452. In some embodiments, it is possible that the order of operation is reversed, such that the output of the halftone module 490 is submitted to the MREt logic 480, or other monochrome enhancement module 480 that can be used.

The apparatus 464 can also include a programmable tolerance register 492 to specify the first and second pixel toner densities. For example, the first pixel toner density may be specified as falling within a first tolerance range (e.g., approximately 90% to 100%) and the second pixel toner density may be specified as falling within a second tolerance range (e.g., approximately 0% to 10%), although embodiments of the invention are not so limited. The programmable tolerance register 492 is capable of being communicatively coupled to the processor 452 and the means 466 to identify the first and second pixel toner densities.

Thus, in another embodiment, the system 450, which can include a color output device 451, such as a color printing mechanism 451, a color display 451, or other device 451 capable of providing a color display in visually-perceptible form, includes a processor 452 and a module 494 (e.g., a combination of the means 466 and 470) capable of being communicatively coupled to the processor 452. The module 494 can be used to identify a first selected number of pixels included in the color plane window 462 as having a first toner density, and to identify a second selected number of pixels included in the color plane window 462 as having a second toner density. The module 494 can also be used to generate first and second modified windows 474, each including identifications corresponding to the first and second selected numbers of pixels in the color plane window 462, respectively.

The system 450 can also include an MREt logic module 480 to receive the first and second modified windows 474 and to determine a pulse code correction to be applied to each one of the windows 474. The pulse code correction can be selected from: no correction, 50% top correction, 50% bottom correction, 50% left correction, and 50% right correction, among others, and embodiments of the invention are not so limited.

The processor 452, memory 454, color planes 460, apparatus 464, means 466, 470, MREt module 480, halftone module 490, register 492 and combination module 494 can all be characterized as "modules" herein. Such modules can include hardware, circuitry, and/or a microprocessor and/or memory circuits, software program modules, and/or firmware, and combinations thereof, as desired by the architect of the system 450 and apparatus 464, and appropriate for particular embodiments of the invention.

For example, a software program module 466 can include the means 466 to identify the first and second pixel toner densities. An electronic circuit 470 can include the means 470 to generate modified color plane windows 474. Similarly, an application specific integrated circuit 494 can include both of the means 466, 470. Other combinations are possible, and embodiments of the invention are not so limited.

One of ordinary skill in the art will understand that the apparatus and systems of various embodiments of the invention can be used in applications other than for printers, and thus, embodiments of the invention are not to be so limited. The illustrations of a system 450 and an apparatus 464 are intended to provide a general understanding of the structure of various embodiments of the invention, and they are not intended to serve as a complete description of all the elements and features of apparatus and systems which might make use of the structures described herein.

Applications which can include the novel apparatus and systems of various embodiments of the invention include electronic circuitry used in high-speed computers, communication and signal processing circuitry, modems, processor modules, embedded processors, and application-specific modules, including multilayer, multi-chip modules. Such apparatus and systems can further be included as subcomponents within a variety of electronic systems, such as televisions, cellular telephones, fax machines, personal computers, radios, vehicles, and others.

Thus, it is now easily understood that another embodiment of the invention can include an article 450, such as a computer, a memory system, a magnetic or optical disk, some other storage device, and/or any type of electronic device or system, comprising a machine-accessible medium 454 (e.g., a memory including an electrical, optical, or electromagnetic conductor) having associated data 494 (e.g., computer program instructions), which when accessed, results in a machine performing such actions as selecting a plurality of original windows, each having a number of pixels included in a different color plane of a multi-plane color image, associating each pixel in each one of the plurality of original windows with an identification of VALID or INVALID to provide a number of identifications corresponding to each one of the plurality original windows, generating a plurality of modified windows corresponding with the plurality of original windows, wherein each one of the plurality of modified windows includes a selected corresponding number of identifications, and transmitting each one of the plurality of the modified windows to MREt logic.

As discussed previously, associating each pixel in each one of the plurality of original windows with an identification of VALID can include associating pixels with an identification of ON or OFF, perhaps using the mechanism of contrasting binary values, although embodiments of the invention are not so limited. Further, selecting a plurality of original windows can include selecting a window having dimensions of X by X pixels, where X is equal to an odd number greater than or equal to three, such as 3 by 3 pixels, or 5 by 5 pixels, and so forth (see FIGS. 2A-2B). Modified color plane windows may have similar dimensions, or be selected having dimensions of X by X, wherein X is equal to five (see FIG. 2C), although embodiments of the invention are not so limited.

Although specific embodiments have been illustrated and described herein, those of ordinary skill in the art will appreciate that any arrangement calculated to achieve the same purpose can be substituted for the embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature of the technical disclosure. It is submitted with the understanding that it will not be used to interpret or limit the scope or meaning of the claims.

In the foregoing detailed description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. An apparatus, comprising:
   means to identify a first pixel toner density and a second pixel toner density associated with selected ones of a plurality of pixels included in a color plane window; and
   a programmable tolerance register to specify the first pixel toner density as falling within a first tolerance range and to specify the second pixel toner density as falling within a second tolerance range.

2. The apparatus of claim 1, wherein a software program module includes the means to identify the first and second pixel toner densities.

3. The apparatus of claim 1, further comprising:
   means to generate at least one modified color plane window having identifications assigned to the first and second pixel toner densities for transmission to a monochrome enhancement module.

4. The apparatus of claim 1, wherein the first pixel toner density is approximately 100%, and wherein the second pixel toner density Is approximately 0%.

5. The apparatus of claim 3, wherein:
   an electronic circuit includes the means to generate the at least one modified color is window.

6. A method, comprising:
   selecting an original window having a number of pixels included in at least one color plane of a multi-plane color image;
   associating a first selected number of pixels in the original window with an identification of ON to generate a first modified window including a number of ON identifications;
   associating a second selected number of pixels in the original window with an identification of OFF to generate a second modified window including a number of OFF identifications; and
   determining whether a correction match exists between corrections applied to the first and second modified windows, respectively.

7. The method of claim 6, further comprising:
   transmitting the first and second modified windows to a monochrome enhancement module.

8. The method of claim 7, further comprising:
   transmitting a pulse code correction for the color plane window to a subsequent operation if the correction match exists.

9. The method of claim 8, wherein transmitting a pulse code correction for the color plane window further comprises:
   transmitting a centered half-pulse as a carrier wave.

\* \* \* \* \*

UNITED STATES PATENT AND TRADEMARK OFFICE
CERTIFICATE OF CORRECTION

PATENT NO. : 7,251,061 B2  
APPLICATION NO. : 10/284868  
DATED : July 31, 2007  
INVENTOR(S) : Brad R. Larson et al.

It is certified that error appears in the above-identified patent and that said Letters Patent is hereby corrected as shown below:

In column 10, line 30, in Claim 4, delete "Is" and insert -- is --, therefor.

In column 10, line 33, in Claim 5, delete "is" and insert -- plane --, therefor.

Signed and Sealed this

Fifth Day of August, 2008

JON W. DUDAS  
*Director of the United States Patent and Trademark Office*